United States Patent
Srivastav et al.

(10) Patent No.: US 9,858,013 B1
(45) Date of Patent: Jan. 2, 2018

(54) SCALABLE DISTRIBUTED STORAGE SYSTEM INFRASTRUCTURE

(71) Applicant: EMC Corporation, Hopkinton, MA (US)

(72) Inventors: Shashwat Srivastav, Seattle, WA (US); Sriram Sankaran, Redmond, WA (US); Vishrut Shah, Redmond, WA (US); Qi Zhang, Redmond, WA (US); Jun Luo, Bellevue, WA (US); Chen Wang, Shanghai (CN); Huapeng Yuan, Seattle, WA (US); Karthik Navaneethakrishnan, Bellevue, WA (US); Jie Song, Shanghai (CN); Wei Yin, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/319,368

(22) Filed: Jun. 30, 2014

Related U.S. Application Data (60) Provisional application No. 61/988,603, filed on May 5, 2014, provisional application No. 61/988,796, filed on May 5, 2014.

(51) Int. Cl.
*G06F 12/00* (2006.01)
*G06F 13/00* (2006.01)
(Continued)

(52) U.S. Cl.
CPC ............ *G06F 3/067* (2013.01); *G06F 3/0604* (2013.01); *G06F 3/0638* (2013.01); *G06F 3/0653* (2013.01); *G06F 2003/0697* (2013.01)

(58) Field of Classification Search
CPC ..................... G06F 3/06; G06F 3/0604; G06F 3/061–3/0613; G06F 3/0614–3/0619;
(Continued)

(56) References Cited

U.S. PATENT DOCUMENTS

| | | | | |
|---|---|---|---|---|
| 6,021,508 | A | * | 2/2000 | Schmuck .................. G06F 9/52 707/E17.01 |
| 6,032,216 | A | * | 2/2000 | Schmuck .................. G06F 9/52 707/999.01 |

(Continued)

OTHER PUBLICATIONS

Implementation of a Software-Defined Storage Service with Heterogeneous Storage Technologies; Yang et al; IEEE 29th International Conference on Advanced Information Networking and Applications Workshops; Mar. 24-27, 2015; pp. 102-107 (6 pages).*

(Continued)

*Primary Examiner* — Daniel C Chappell
(74) *Attorney, Agent, or Firm* — Konrad R. Lee; Krishnendu Gupta (57) ABSTRACT

A computer-executable method, computer program product, and system for managing metadata within a distributed data storage system, including a compute node in communication with a data storage array, the computer-executable method, computer program product, and system comprising receiving a data I/O from an application executing within the distributed data storage system, and creating a first storage system within the compute node, wherein the first storage system is enabled to manage metadata related to the data I/O, and processing the data I/O using the first storage system.

6 Claims, 9 Drawing Sheets

(51) Int. Cl.
*G06F 13/28* (2006.01)
*G06F 3/06* (2006.01)

(58) Field of Classification Search
CPC ...... G06F 3/0638; G06F 3/0653; G06F 3/067;
G06F 3/0671; G06F 3/0673–3/0679;
G06F 3/068; G06F 3/0683–3/0689; G06F
2003/0692; G06F 2003/0697; G06F
17/30182; G06F 17/30194–17/30197;
G06F 17/302; G06F 17/30203–17/30221;
H04L 67/1097
USPC .......................................................... 711/114
See application file for complete search history.

(56) References Cited

U.S. PATENT DOCUMENTS

| | | | | |
|---|---|---|---|---|
| 7,711,897 | B1 * | 5/2010 | Chatterjee | G06F 3/0605 |
| | | | | 711/112 |
| 8,321,643 | B1 * | 11/2012 | Vaghani | G06F 3/0604 |
| | | | | 711/162 |
| 8,510,279 | B1 * | 8/2013 | Natanzon | G06F 17/30073 |
| | | | | 707/697 |
| 8,671,265 | B2 * | 3/2014 | Wright | G06F 15/173 |
| | | | | 711/1 |
| 9,003,021 | B2 * | 4/2015 | Wright | G06F 3/0613 |
| | | | | 709/224 |
| 9,396,198 | B2 * | 7/2016 | Takaoka | G06F 17/30067 |
| 2002/0078174 | A1 * | 6/2002 | Sim | G06F 17/30194 |
| | | | | 709/219 |
| 2002/0133491 | A1 * | 9/2002 | Sim | G06F 17/30067 |
| 2003/0195895 | A1 * | 10/2003 | Nowicki | G06F 17/30067 |
| 2004/0122917 | A1 * | 6/2004 | Menon | G06F 17/30194 |
| | | | | 709/219 |
| 2007/0260830 | A1 * | 11/2007 | Faibish | G06F 3/061 |
| | | | | 711/162 |
| 2007/0260842 | A1 * | 11/2007 | Faibish | G06F 3/061 |
| | | | | 711/170 |
| 2013/0019067 | A1 * | 1/2013 | Vilayannur | G06F 12/08 |
| | | | | 711/144 |
| 2015/0193169 | A1 * | 7/2015 | Sundaram | G06F 3/0641 |
| | | | | 711/103 |

OTHER PUBLICATIONS

ZettaDS: A Light-weight Distributed Storage System for Cluster; Liu et al; The Third ChinaGrid Annual Conference; Aug. 20-22, 2008; pp. 158-164 (7 pages).*
QuickSilver distributed file services: an architecture for horizontal growth; Cabrera et al; Proceedings of the 2nd IEEE Conference on Computer Workstations; Mar. 7-10, 1999; pp. 23-37 (15 pages).*
A reliable object-oriented data repository for a distributed computer system; Svobodova, Liba; Proceedings of the eighth ACM symposium on Operating systems principles; Dec. 14-16, 1981; pp. 47-58 (12 pages).*

* cited by examiner

SCALABLE DISTRIBUTED STORAGE SYSTEM INFRASTRUCTURE

CROSS REFERENCE TO RELATED APPLICATIONS

This Application claims priority from U.S. Provisional Patent Application Ser. Nos. 61/988,603 entitled "DISTRIBUTED DATA STORAGE MANAGEMENT" and 61/988,796 entitled "ZONE CONSISTENCY" filed on May 5, 2014 the content and teachings of which are hereby incorporated by reference in their entirety.

This Application is related to U.S. patent application Ser. No. 14/319,349 entitled "DISTRIBUTED DATA STORAGE MANAGEMENT", Ser. No. 14/319,360 entitled "DISTRIBUTED METADATA MANAGMENT", Ser. No. 14/319,378 entitled "DISTRIBUTED DATA STORAGE MANAGEMENT", Ser. No. 14/319,383 entitled "DATA BACKUP MANAGEMENT ON DISTRIBUTED STORAGE SYSTEMS", Ser. No. 14/319,113 entitled "ZONE CONSISTENCY", and Ser. No. 14/319,117 entitled "ZONE CONSISTENCY" filed on even date herewith, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, computer program product, and system for managing metadata within a distributed data storage system, including a compute node in communication with a data storage array, the computer-executable method, computer program product, and system comprising receiving a data I/O from an application executing within the distributed data storage system, and creating a first storage system within the compute node, wherein the first storage system is enabled to manage metadata related to the data I/O, and processing the data I/O using the first storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, distributed data storage systems are tasked with managing larger and larger data set, often referred to as big data. Generally, to manage big data, a distributed data storage system creates metadata to enable the distributed data storage system to manage, store, and/or access the big data efficiently. Conventionally, as big data grows, so does its associated metadata, which can become unwieldy to manage by itself. Typically, improving the ability to manage metadata within a distributed data storage system would be beneficial to the data storage system industry.

In many embodiments, the current disclosure may enable creation of a distributed data storage system that may be enabled to manage large amounts of metadata associated with big data. In various embodiments, the current disclosure may enable a distributed data storage system to create one or more dynamically created sub-systems to manage metadata within a distributed data storage system. In most embodiments, the current disclosure may enable a distributed data storage system to utilize a storage engine to manage one or more layers (or abstractions) of metadata associated with data. In other embodiments, the current disclosure may enable a distributed data storage system to dynamically add or remove layers and/or levels of abstraction to manage metadata as the amount of metadata changes over time.

In many embodiments, a distributed data storage system may include one or more zones and/or clusters. In various embodiments, a zone and/or cluster may include one or more compute nodes and one or more data storage arrays. In certain embodiments, a zone and/or cluster may be enabled to communicate with one or more zones and/or clusters in the distributed data storage systems. In most embodiments, a zone and/or cluster may be enabled to manage and/or store data chunk format. In various embodiments, chunk format may include file and object storage formats. In other embodiments, chunk format may be portions of data storage of a specified size (i.e. 64 MB/125 MB). In certain embodiments, a zone may be a cluster. In some embodiments, a cluster may be a zone. In certain embodiments, a zone may include one or more clusters.

In most embodiments, a cluster may include one or more compute nodes and one or more data storage arrays. In various embodiments, a compute node may include a storage engine for manage data services, metadata, Quality of Service, and/or communication between one or more of the nodes in the distributed data storage system. In certain embodiments, applications may communicate with a node's storage engine to facilitate use of data storage within the distributed data storage system.

In many embodiments, a storage engine may include one or more layers. In various embodiments, layers within a storage engine may include a transaction layer, index layer, chunk management layer, storage server management layer, partitions record layer, and/or a storage server (Chunk I/O) layer. In certain embodiments, a transaction layer may parse received object request from applications within a distributed data storage system. In most embodiments, a transaction layer may be enable to read and/or write object data to the distributed data storage system. In some embodiments, data written to a distributed data storage system may be in a chunk format which may be portions of data storage of a specified size (i.e. 64 mb/128 mb). In many embodiments, an index layer may be enabled to map file-name/data-range to data stored within the distributed data storage system. In various embodiments, an index layer may be enabled to manage secondary indices which may be used to manage data stored on the distributed data storage system.

In many embodiments, a chunk management layer may manage chunk information, such as, but not limited to, location and/or management of chunk metadata. In various embodiments, a chunk management layer may be enabled to execute per chunk operations. In certain embodiments, a storage server management layer may monitor the storage server and associated disks. In most embodiments, a storage server management layer may be enabled to detect hardware failures and notify other management services of failures within the distributed data storage system. In some embodiments, a partitions record layer may record an owner node of a partition of a distributed data storage system. In many embodiments, a partitions record layer may record metadata of partitions, which may be in a btree and journal format.

In most embodiments, a storage server layer may be enabled to direct I/O operations to one or more data storage arrays within the distributed data storage system. In various embodiments, a chunk manager service may select which storage server may be utilized for received I/O requests. In certain embodiments, a storage server manager service may be utilized to select disks to be utilized on storage servers selected by the chunk manager service. In most embodiments, once a chunk manager server and storage server manager service has initially processed an I/O request, a transaction layer may be enabled to access one or more storage servers based on the chunk manager service and/or storage server manager service directives.

Figure 1:
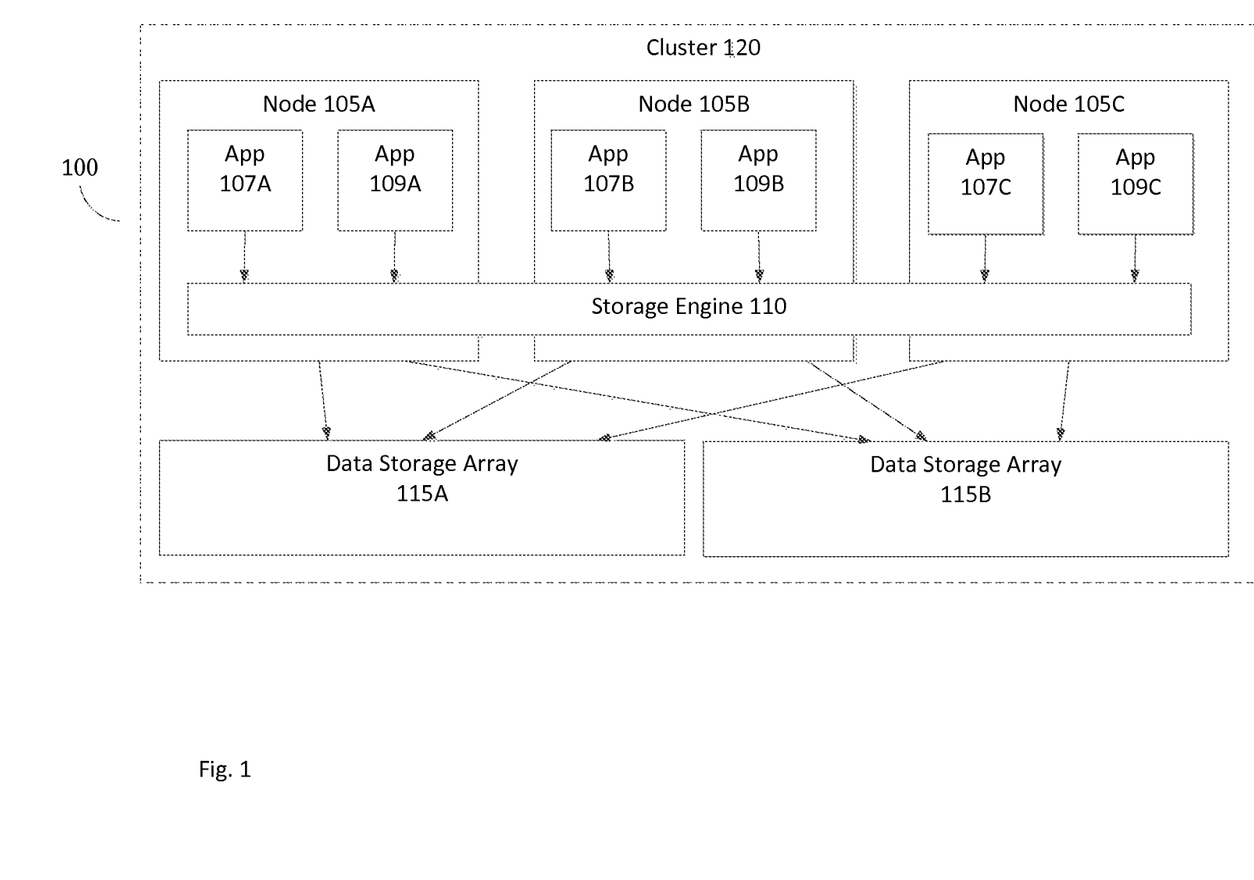
FIG. 1 is a simplified illustration of a distributed data storage system, in accordance with an embodiment of the present disclosure.

Refer to the example embodiment of FIG. 1. FIG. 1 is a simplified illustration of a distributed data storage system, in accordance with an embodiment of the present disclosure. As shown, distributed data storage system 100 includes cluster 120 which includes Node (105A-C, 105 Generally), and Data Storage Arrays (115A-B, 115 Generally). Node 105A is in communication with data storage array 115A and Data storage Array 115B. Node 105B is in communication with data storage array 115A and 115B. Node 105C is in communication with data storage array 115A and Data storage Array 115B. In FIG. 1, storage engine 110 is executed on each node 105. storage engine 110 enables Applications 107A, 109A, 107B, 109B, 107C, 109C to execute data I/O requests to and from distributed data storage system 100. In various embodiments, a distributed data storage system may include one or more clusters which may be located in one or more locations.

Figure 2:
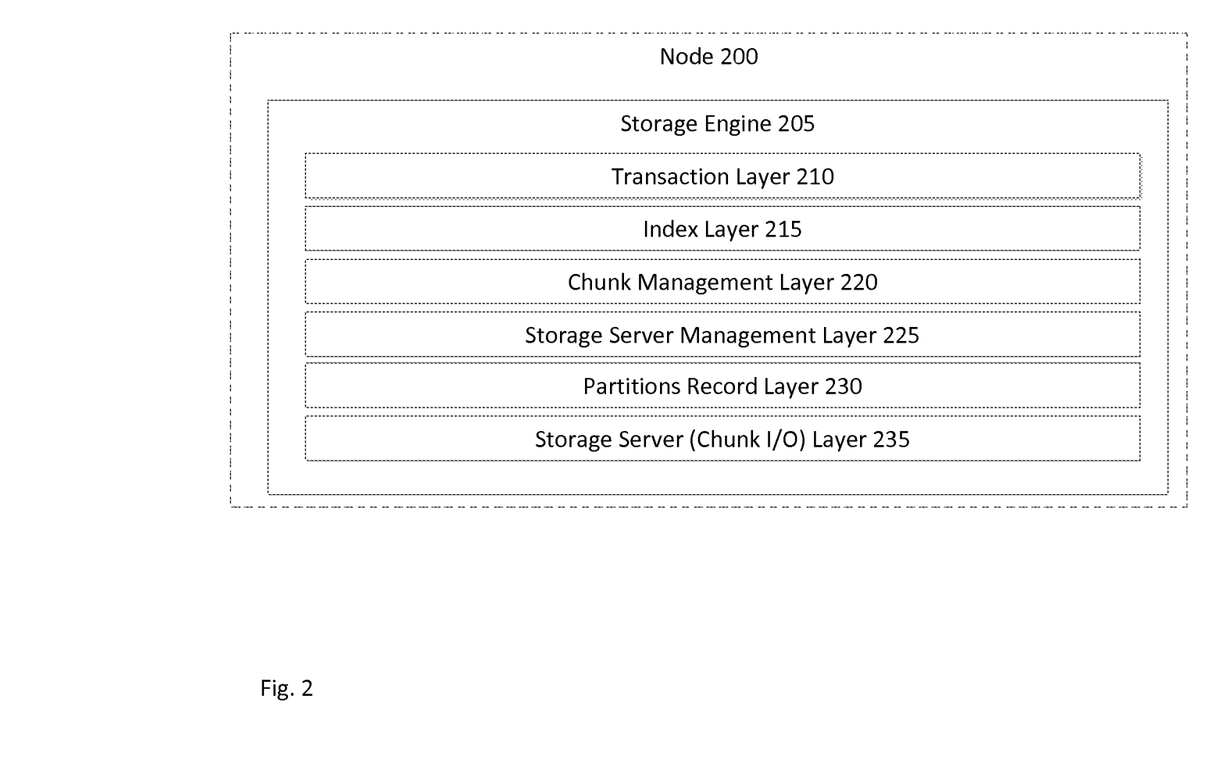
FIG. 2 is a simplified illustration of a node within a cluster of a distributed data storage system, in accordance with an embodiment of the present disclosure.

Refer to the example embodiment of FIG. 2. FIG. 2 is a simplified illustration of a node within a cluster of a distributed data storage system, in accordance with an embodiment of the present disclosure. As shown, Node 200 executes storage engine 205. Storage engine 205 includes multiple layers for management of node 200 within a distributed data storage system. Storage engine 205 includes transaction layer 210, index layer 215, chunk management layer 220, storage server management layer 225, partitions record layer 230, and storage server layer 235. One or more layers within storage engine 205 on node 200 are enabled to communicate with other nodes in a cluster of distributed data storage systems. In various embodiments, one or more layers within a storage engine on a node may be enabled to communicate with other nodes in one or more other clusters of a distributed data storage system.

Figure 3:
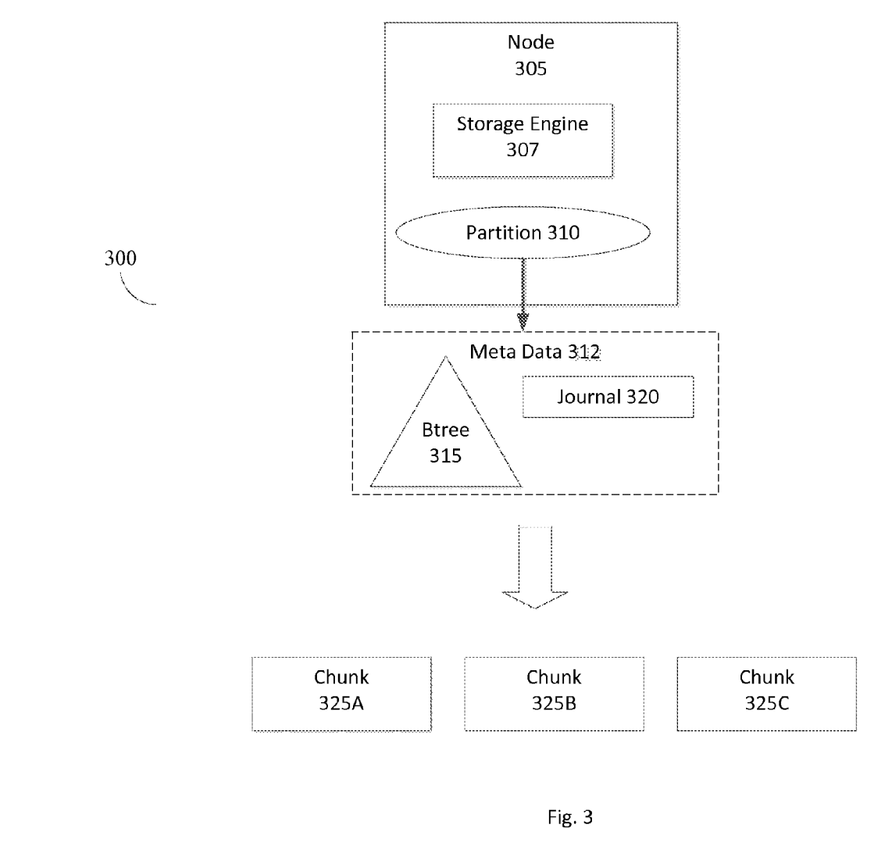
FIG. 3 is a simplified illustration of a metadata in a distributed data storage system, in accordance with an embodiment of the present disclosure.

Refer to the example embodiment of FIG. 3. FIG. 3 is a simplified illustration of a metadata in a distributed data storage system, in accordance with an embodiment of the present disclosure. As shown, Node 305 is part of distributed data storage system 300. Node 305 manages partition 310 and includes storage engine 307. Partition 310 includes metadata 312 which is stored using Btree 315 and journal 320. Metadata 312 is stored on chunks (325A-C, 325 Generally). Chunks 325 are stored throughout distributed data storage system 300. In most embodiments, chunks of data may include data stored in file, object, and or other data storage formats. In various embodiments, a chunk may mean a specified amount of data storage within a distributed data storage system. In this embodiment, storage engine 307 manages placement and/or stores the location of partition 310.

Figure 4:
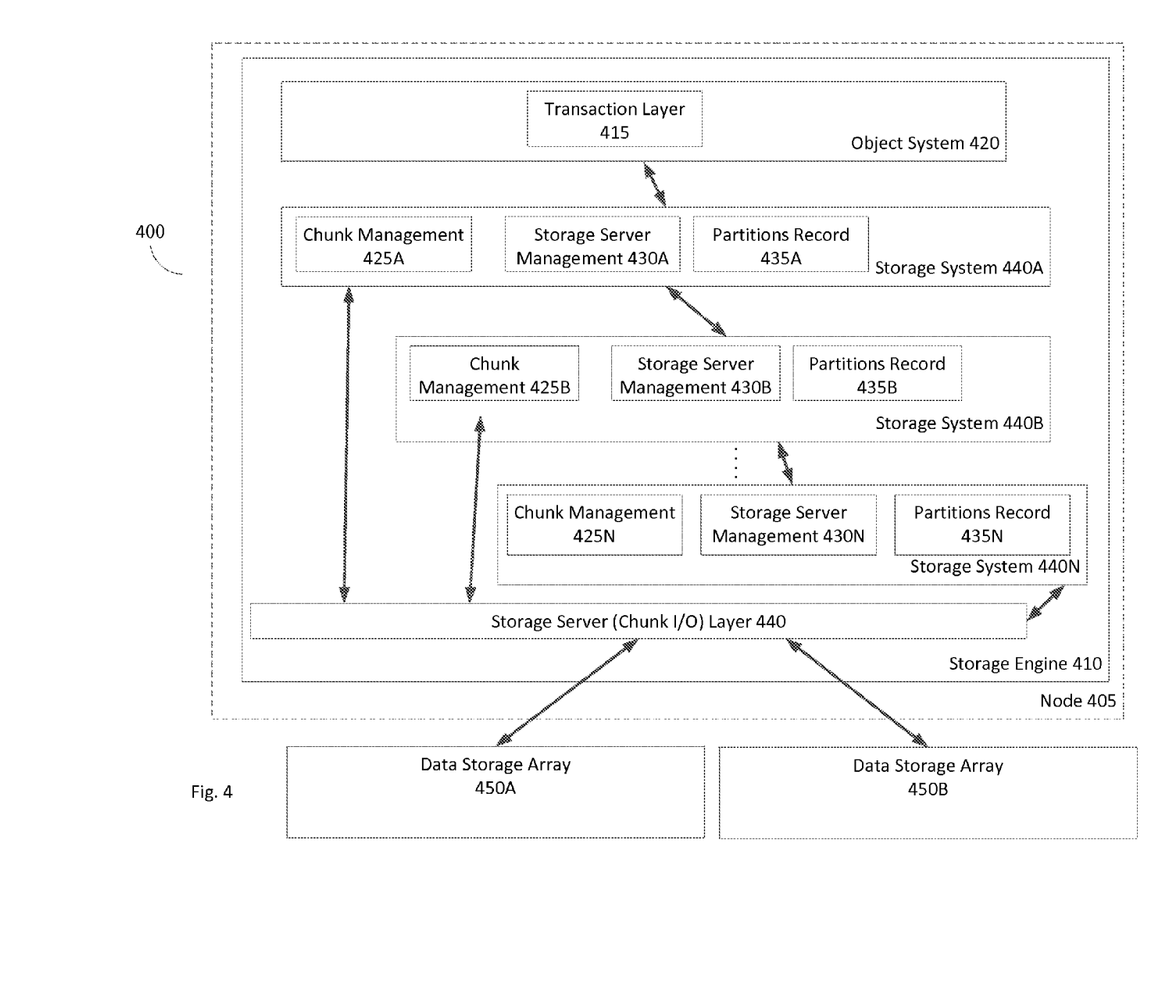
FIG. 4 is a simplified illustration of a scalable distributed data storage system, in accordance with an embodiment of the present disclosure.

Refer to the example embodiment of FIG. 4. FIG. 4 is a simplified illustration of a scalable distributed data storage system, in accordance with an embodiment of the present disclosure. As shown, Node 405 includes storage engine 410 and is in communication with data storage array 450A and data storage array 450B. Storage engine 410 is enabled to manage multiple levels of data and/or metadata within storage engine 410. In this embodiment, storage engine includes storage systems (440A-N, 440 Generally). Storage system 440A includes chunk management 425A, storage server management 430A, and partitions record 435A. Storage system 440B includes Chunk management 425B, storage server management 430B, and partitions record 435B. Storage system 440N includes chunk management 425N, storage server management 430N, and Partitions record 435N. In most embodiments, a storage engine may be enabled to create one or more storage systems to manage metadata managed by a storage engine. In some embodiments, metadata created from managing data may be so difficult, that the metadata created may be managed by a secondary instantiation of a storage system to manage the metadata. In various embodiments, a secondary instantiation of a storage system may create secondary metadata to manage the first level of metadata created. In Most embodiments, where distributed data storage system may operate on big data sets, a distributed data storage system may need to create multiple instantiations of a storage system to reduce created metadata to a manageable amount of data.

In this embodiment, storage system 440A is in communication with storage server Layer 440 and storage system 440B. Storage system 440B is in communication with storage system 440A, storage server layer 440, and is enabled to connect to storage system 440N. Storage system 440N is in communication with Storage system 440B and storage server layer 440. In various embodiments, a storage engine may include multiple storage systems which may be enabled to manage portions of the data managed within a given node. In this embodiment, storage system 440A is enabled to store data on data storage array 450A and/or data storage array 450B. Storage system 440A is enabled to manage a portion of the data storage system 440A manages using storage system 440B. Storage system 440B is enabled to store data on data storage array 450A and data storage array 450B. Storage system 440B is enabled to manage a portion of the data stored by storage system 440B using storage system 440N. In many embodiments, one or more storage systems may be use to portion data storage within a distributed data storage system into smaller manageable portions.

Figure 5:
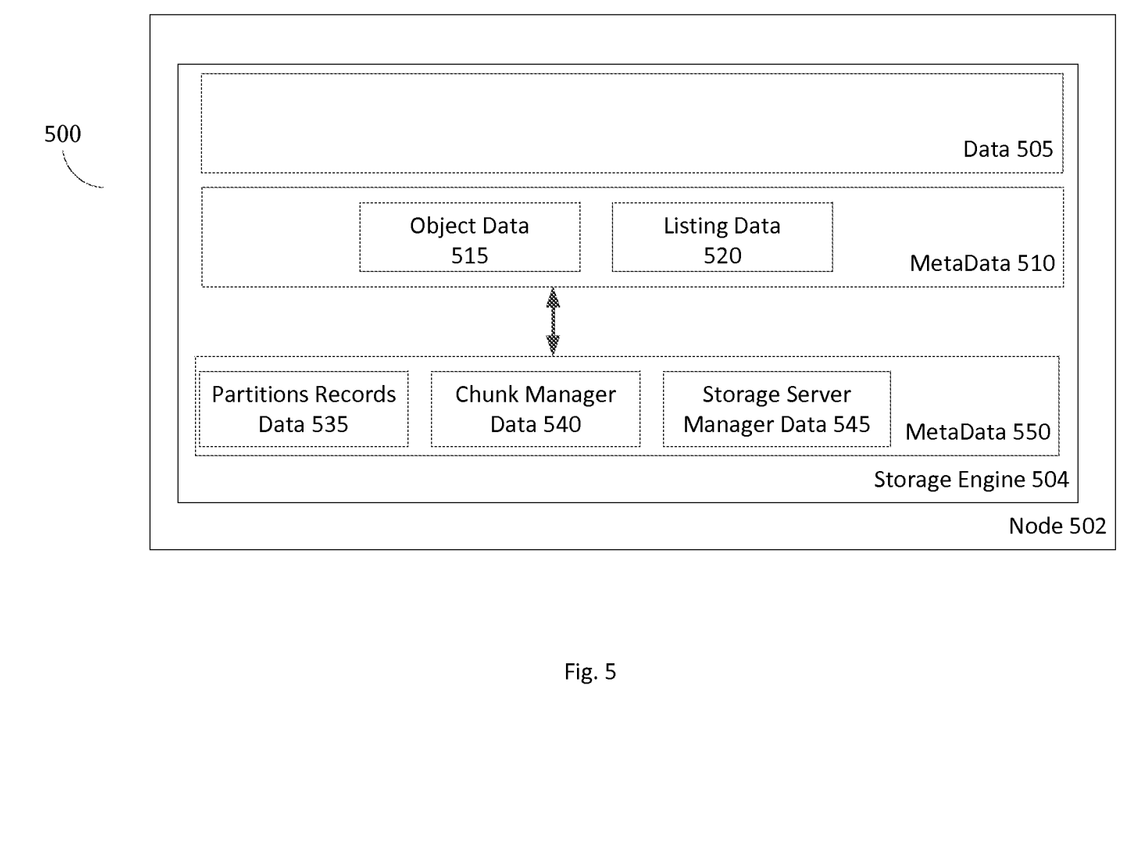
FIG. 5 is a simplified illustration of management of data within a storage engine on a node of a distributed data storage system, in accordance with an embodiment of the present disclosure.

Refer to the example embodiment of FIG. 5. FIG. 5 is a simplified illustration of management of data within a storage engine on a node of a distributed data storage system, in accordance with an embodiment of the present disclosure. In this embodiment, distributed data storage system 500 includes node 502, which includes storage engine 504. Storage engine 504 is enabled to manage data 505 and associated metadata. As shown, storage engine 504 created metadata 510, which includes object data 515 and listing data 520 and/or information relating to the portion of data storage within distributed data storage system 500 that data 505 is stored. Storage engine 504 has determined that metadata 510 exceeds a threshold size of metadata to be managed and creates metadata 550 to manage metadata 510. Metadata 550 includes partitions records data 535, chunk manager data 540, and storage server manager data 545, and other data related to storage of metadata 510.

Figure 6:
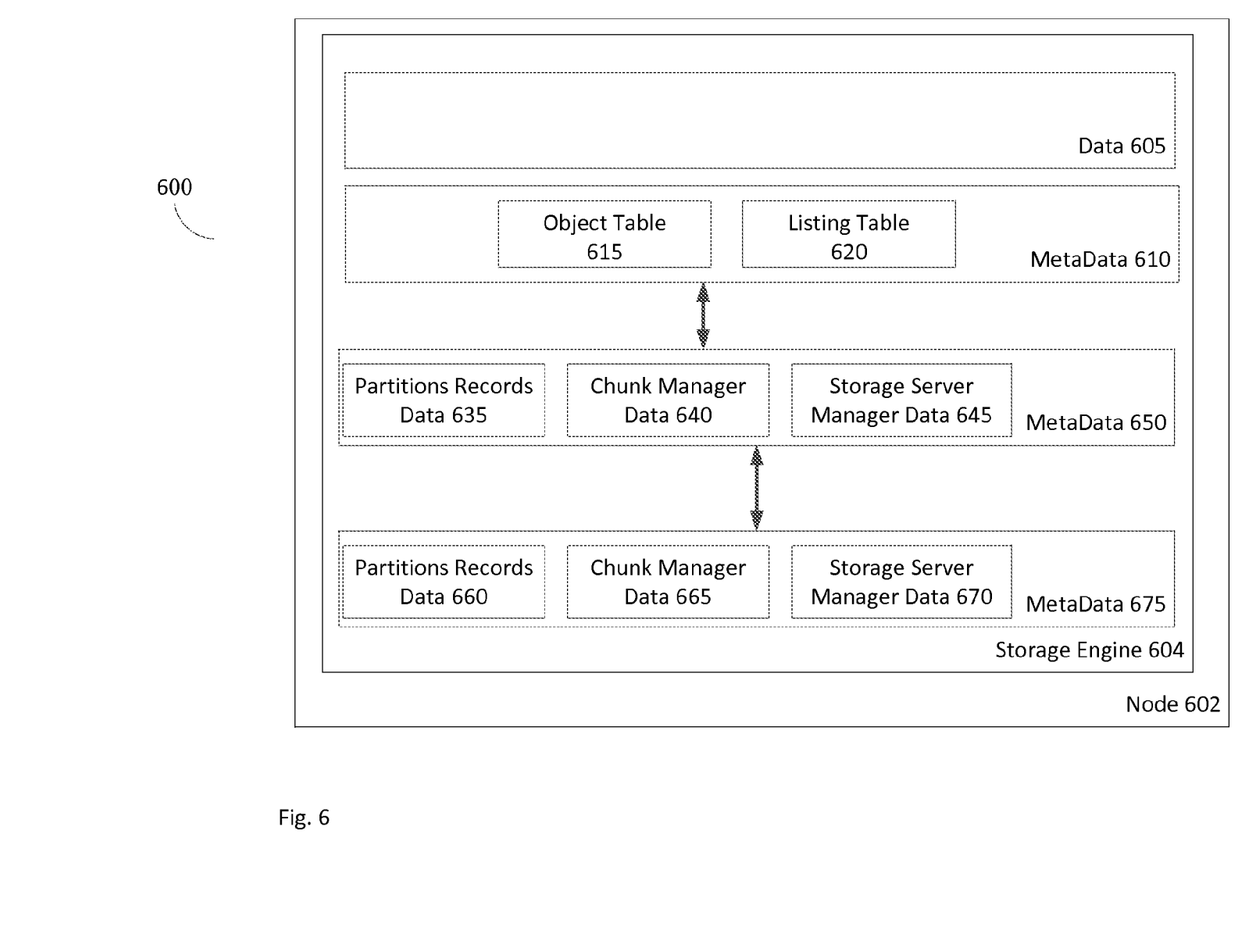
FIG. 6 is an alternate simplified illustration of metadata management within a storage engine of a node of a distributed data storage system, in accordance with an embodiment of the present disclosure.

Refer to the example embodiment of FIG. 6. FIG. 6 is an alternate simplified illustration of metadata management within a storage engine of a node of a distributed data storage system, in accordance with an embodiment of the present disclosure. As shown, distributed data storage system 600 includes node 602. Node 602 includes storage engine 604. In this embodiment, storage engine 604 receives data 605 and creates metadata 610, which includes object data 615 and listing table 620. Storage engine determines that the size of metadata 610 exceeds a threshold size and creates metadata 650 to manage metadata 610. Metadata 650 includes partitions records data 635, chunk manager data 640, and storage server manager data 645. Storage engine 604 again determines that Metadata 650 exceeds a threshold size and creates metadata 675 to manage metadata 650. Metadata 675 includes partitions records data 660, chunk manager data 665, and storage server manager data 670. In many embodiments, a user and/or administrator may direct a storage engine to create one or more levels within the storage engine to manage metadata. In various embodiments, a user and/or administrator may direct a storage engine to create a level of metadata management for metadata exceeding a specified size and/or other data storage characteristic trait.

Figure 7:
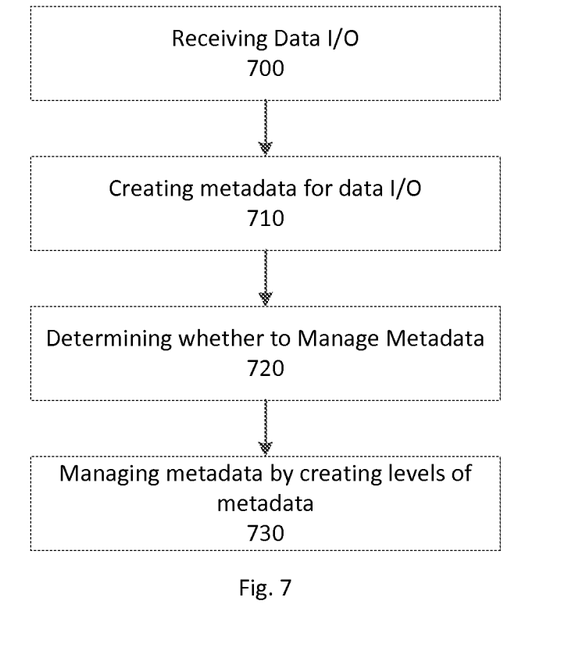
FIG. 7 is a simplified flowchart of a method of managing metadata in the distributed data storage system of FIG. 4, in accordance with an embodiment of the present disclosure.

Refer to the example embodiments of FIGS. 4 and 7. FIG. 7 is a simplified flowchart of a method of managing metadata in the distributed data storage system of FIG. 4, in accordance with an embodiment of the present disclosure. In FIG. 4, distributed data storage system 400 includes node 405, data storage array 450A and data storage array 450B. Node 405 includes storage engine 410. Storage engine includes object system 420, storage systems (440A-N, 440 Generally), and storage server Layer 440. Object system 420 receives data I/Os from applications operating using node 405 (Step 700). Object system 420 utilizes transaction layer 415 to direct the received I/O to storage system 440A, which creates metadata for received data I/O (Step 710) using chunk management 425A, storage management 430A, and partitions record 435A. Storage system 440A stores received I/Os and associated metadata on either data storage array 450A or data storage array 450B using storage server layer 440. Storage engine 410 analyzes created metadata to determine whether created metadata exceeds a specified threshold for further management (Step 720). Upon a positive determination, storage engine 410 creates storage system 440B which is enabled to manage metadata created by storage system 440A. Storage system 440B utilizes chunk management 425B, storage server management 430B, and partitions record 435B to create metadata on metadata created by storage system 440A (Step 730). Storage system 440B stores metadata created at storage system 440B on either data storage array 450A or data storage array 450B using storage server layer 440. Upon a negative determination, storage engine 410 maintains the current allocation of storage systems 440. In many embodiments, if the amount of metadata managed by a storage engine is reduced, a storage engine may remove one or more dynamically created storage systems.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
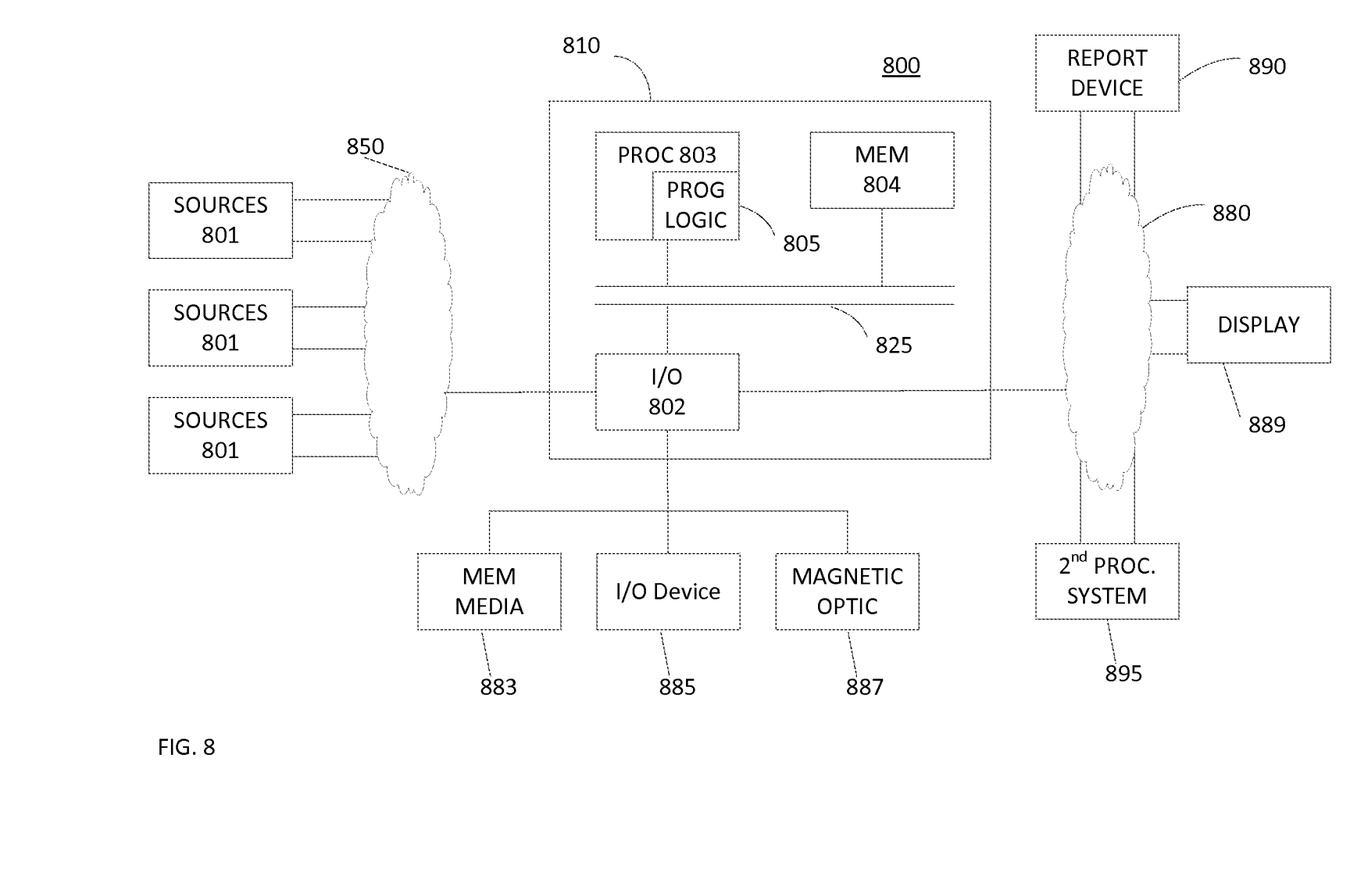
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
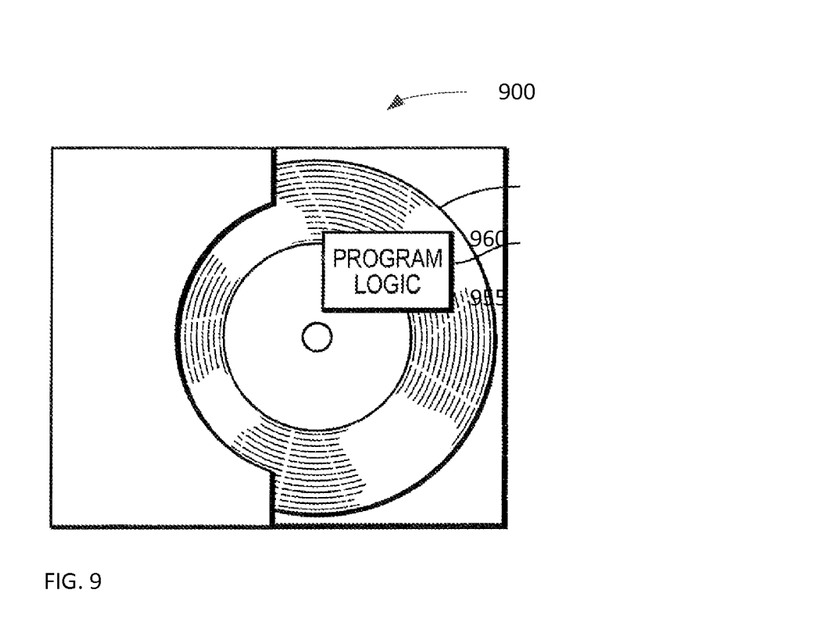
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing metadata within a distributed data storage system, including a compute node in communication with a data storage array, the computer-executable method comprising:
   receiving a data I/O from an application executing within the distributed data storage system; and
   creating a first storage system within the compute node, wherein the first storage system is enabled to manage metadata related to the data I/O, wherein the first storage system is enabled to create one or more storage systems within the first storage system to manage the metadata;
   dynamically creating and managing a first level of sub storage systems to manage portions of the metadata associated with the data I/O, wherein each of the first level sub storage systems are enabled to create and manage a second level of sub storage systems wherein each of the second level of sub storage systems are enabled to manage portions of the portions of metadata managed by the first level sub storage system associated with each of the second level sub storage systems; and
   processing the data I/O using the first storage system, wherein the processing comprises creating a first portion of metadata related to the data I/O; analyzing the first portion of metadata to make a determination based on one or more characteristics of the first portion of metadata; upon a positive determination, creating a second storage system within the compute node, wherein the second storage system is enabled to manage metadata created by the first storage system; creating a second portion of metadata based on the first portion of metadata; and storing the second portion of metadata on the data storage array.

2. The computer-executable method of claim 1, wherein a first characteristic of the one or more characteristic of the metadata is an amount of the metadata.

3. A system, comprising:
   a distributed data storage system including a compute node in communication with a data storage array; and
   computer-executable program logic encoded in memory of one or more computers in communication with the distributed data storage system to enable management of metadata within the distributed data storage system, wherein the computer-executable program logic is configured for the execution of:
   receiving a data I/O from an application executing within the distributed data storage system; and
   creating a first storage system within the compute node, wherein the first storage system is enabled to manage metadata related to the data I/O, wherein the first storage system is enabled to create one or more storage systems within the first storage system to manage the metadata;
   dynamically creating and managing a first level of sub storage systems to manage portions of the metadata associated with the data I/O, wherein each of the first level sub storage systems are enabled to create and manage a second level of sub storage systems wherein each of the second level of sub storage systems are enabled to manage portions of the portions of metadata managed by the first level sub storage system associated with each of the second level sub storage systems; and
   processing the data I/O using the first storage system 22, wherein the processing comprises creating a first portion of metadata related to the data I/O; analyzing the first portion of metadata to make a determination based on one or more characteristics of the first portion of metadata; upon a positive determination, creating a second storage system within the compute node, wherein the second storage system is enabled to manage metadata created by the first storage system; creating a second portion of metadata based on the first portion of metadata; and storing the second portion of metadata on the data storage array.

4. The system of claim 3, wherein a first characteristic of the one or more characteristic of the metadata is an amount of the metadata.

5. A computer program product for managing metadata within a distributed data storage system, including a compute node in communication with a data storage array, the computer program product comprising:

a non-transitory computer readable medium encoded with computer-executable program code for using read signatures in replication, the code configured to enable the execution of:
- receiving a data I/O from an application executing within the distributed data storage system; and
- creating a first storage system within the compute node, wherein the first storage system is enabled to manage metadata related to the data I/O, wherein the first storage system is enabled to create one or more storage systems within the first storage system to manage the metadata;
- dynamically creating and managing a first level of sub storage systems to manage portions of the metadata associated with the data I/O, wherein each of the first level sub storage systems are enabled to create and manage a second level of sub storage systems wherein each of the second level of sub storage systems are enabled to manage portions of the portions of metadata managed by the first level sub storage system associated with each of the second level sub storage systems; and
- processing the data I/O using the first storage system 21, wherein the processing comprises creating a first portion of metadata related to the data I/O; analyzing the first portion of metadata to make a determination based on one or more characteristics of the first portion of metadata; upon a positive determination, creating a second storage system within the compute node, wherein the second storage system is enabled to manage metadata created by the first storage system; creating a second portion of metadata based on the first portion of metadata; and storing the second portion of metadata on the data storage array.

6. The computer program product of claim 5, wherein a first characteristic of the one or more characteristic of the metadata is an amount of the metadata.

* * * * *